C. H. GUILES.
RIM TOOL.
APPLICATION FILED NOV. 29, 1916.

1,232,292.

Patented July 3, 1917.

C. H. Guiles,
Inventor

Witnesses by C. A. Snow & Co.
Attorneys

UNITED STATES PATENT OFFICE.

CHARLES H. GUILES, OF ADDISON, NEW YORK.

RIM-TOOL.

1,232,292.  Specification of Letters Patent.  Patented July 3, 1917.

Application filed November 29, 1916. Serial No. 134,191.

*To all whom it may concern:*

Be it known that I, CHARLES H. GUILES, a citizen of the United States, residing at Addison, in the county of Steuben and State of New York, have invented a new and useful Rim-Tool, of which the following is a specification.

The device forming the subject matter of this application is adapted to be employed for contracting and expanding a rim of the sort which, being divided to form relatively movable ends, is assembled with a vehicle tire.

The invention aims to provide novel means whereby a rim may be contracted and held in a contracted position, and so to construct the device that the same may be used for expanding the rim to cause the same to coöperate with the tire.

Another object of the invention is to improve the structure in such a way that it will be capable of use on rims of different kinds.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1:
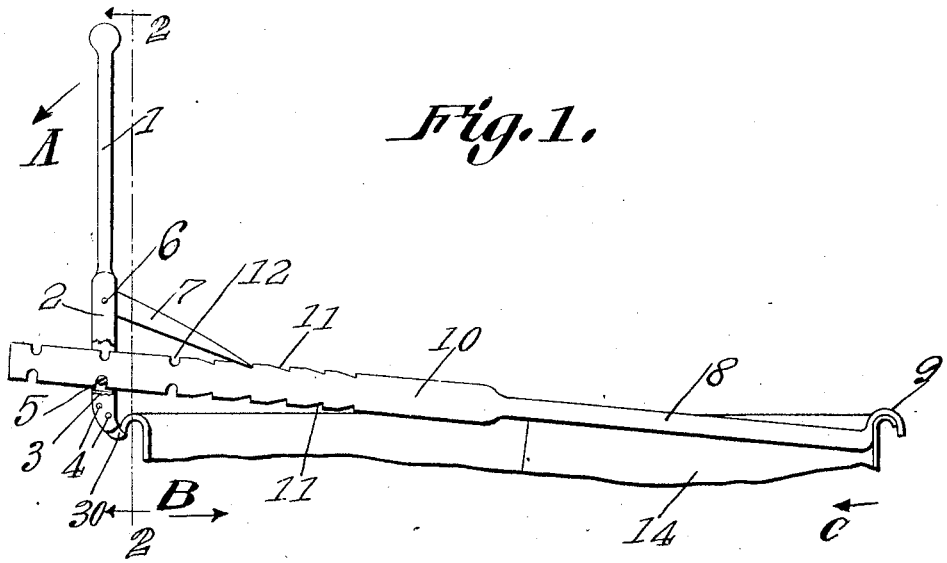
Figure 2:
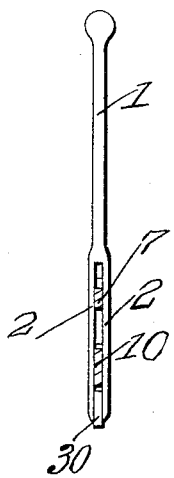

Figure 1 shows the invention in side elevation, applied to a rim, parts appearing in section; and Fig. 2 is a section on the line 2—2 of Fig. 1, the rim shown in Fig. 1 being omitted.

The device forming the subject matter of this application preferably is made of metal throughout and includes a lever 1 having arms 2 spaced apart at their ends by a toe block 3 interposed between the arms and held in place by one or more securing elements 4. The toe block 3 preferably terminates in a laterally inclined hook or tooth 30. Adjacent the toe block 3, the arms 2 of the lever 1 are connected by a fulcrum pin 5. A pivot element 6 connects the arms 2 of the lever 1 above the fulcrum pin 5. The numeral 7 indicates a dog one end of which is located between the arms 2 of the lever 1 and is mounted to swing on the pivot element 6.

The numeral 8 denotes a bar provided with a hook 9 at one end and terminating at its other end in a flattened shank 10 fitting closely but slidably between the arms 2 of the lever 1. The shank 10 is equipped in its upper and lower edges with rack teeth 11 adapted to coöperate with the dog 7 in a manner to be set forth hereinafter. In its upper and lower edges, the shank 10 of the bar 8 is provided with seats 12, any one of which may be engaged with the fulcrum pin 5.

The numeral 14 indicates a rim having relatively movable ends. In order to contract such a rim, to the end that it may be disengaged from the tire (not shown), the hook 9 on the bar 8 is engaged with the rim 14, and the end 30 of the toe block 3 of the lever 1 is engaged with the rim 14 at a diametrically opposite point. If the lever 1 is swung in the direction of the arrow A in Fig. 1, the lever, being fulcrumed at 5 on the shank 10 of the bar 8, will move at its lower end in the direction of the arrow B in Fig. 1, the hook 9 on the bar 8 being drawn in the direction of the arrow C in Fig. 1. In this manner, the rim 14 may be contracted so that it can be removed from the tire. After the rim has been contracted, the tendency of the rim is to expand in a direction opposite to that indicated by the arrows B and C, the upper end of the lever 1 tending to swing in a direction opposite to that indicated by the arrow A. To prevent such an operation, the dog 7 is engaged with one of the rack teeth 11 in the shank 10, as indicated in Fig. 1. Owing to the presence of the dog 7 and the rack teeth 11, therefore, the rim 14 may be locked in a retracted position.

Let it be supposed that it is desired to expand the rim 14, so that the same will coöperate with the tire. Then the hook 9 is engaged with the rim, as shown in Fig. 1, but the lower end of the lever 1 is engaged with the inner side of the rim 14, instead of with the outer side, as shown in the said figure. Then, if the lever 1 be swung in a direction opposite to that indicated by the arrow A, the lower end of the lever will move in a direction opposite to that indicated by the arrow B, and the hook 9 will exert a thrust on the rim 14, in a direction opposite to that indicated by the arrow C. Thus, the rim 14 may be expanded and may be made to coöperate with the tire.

It is to be observed that both of the opposed edges of the shank 10 of the bar 8 are equipped with the rack teeth 11 and with the seats 12. This construction permits the bar 8 to be reversed, so that the bill of the hook 9 points upwardly instead of downwardly. Certain makes of rims require such an operation as that last above described. Further, the toe block 3 may be engaged with one side of the rim 14 as shown in Fig. 1, the bar 8 being reversed so that the bill of the hook 9 points upwardly, the bar 8 extending diagonally of the plane of the rim 14. Such an arrangement of the parts is desirable, at times, since it enables a pull to be exerted on the rim in a direction at an acute angle to the plane defined by the rim. Thus, the relatively movable ends of the rim 14 may not only be moved circumferentially with respect to each other, but may be moved transversely of the plane defined by the rim, this operation permitting one of the ends of the rim to clear certain projections found on structures of the kind with which the rim 14 is assembled.

It will be obvious that since the seats 12 and the rack teeth 11 are duplicated longitudinally of the shank 10 of the bar 8, the device forming the subject matter of this application is adapted to manipulate rims of different diameters.

Having thus described the invention, what is claimed is:—

A tool for expanding and contracting a wheel rim, comprising a lever provided at one end with a rim-engaging means, and provided intermediate its ends with an opening, the lever having a fulcrum member extended into the opening; a bar mounted removably in the opening and provided at one end with a hook including spaced portions disposed transversely of the axis of the bar and adapted, respectively, to exert a push and a pull on a rim, the bar being provided adjacent its other end and in its opposite edges with seats spaced longitudinally of the bar and adapted to receive the fulcrum member and to permit an axial reversal of the bar, in operation; and a dog pivoted to the lever, the bar having racks in its edges wherewith the dog engages when the bar is in direct and reverse positions.

In testimony that I claim the foregoing as my own, I have hereto affixed my signature in the presence of two witnesses.

CHARLES H. GUILES.

Witnesses:
 E. EVERETS,
 M. CASSON, Jr.